United States Patent
Neuvonen

(10) Patent No.: US 7,067,997 B2
(45) Date of Patent: Jun. 27, 2006

(54) METHOD FOR DETERMINING ROTOR POSITION ANGLE OF SYNCHRONOUS MACHINE

(75) Inventor: Mika Neuvonen, Lappeenranta (FI)

(73) Assignee: ABB OY, Helsinki (FI)

( * ) Notice: Subject to any disclaimer, the term of this patent is extended or adjusted under 35 U.S.C. 154(b) by 74 days.

(21) Appl. No.: 10/484,245

(22) PCT Filed: Oct. 23, 2002

(86) PCT No.: PCT/FI02/00823

§ 371 (c)(1),
(2), (4) Date: Jul. 16, 2004

(87) PCT Pub. No.: WO03/036788

PCT Pub. Date: May 1, 2003

(65) Prior Publication Data

US 2004/0239285 A1  Dec. 2, 2004

(30) Foreign Application Priority Data

Oct. 24, 2001 (FI) ................................. 20012060

(51) Int. Cl.
*H02P 3/00* (2006.01)

(52) U.S. Cl. ...................... 318/254; 318/700; 318/705; 318/701; 318/721

(58) Field of Classification Search ................ 318/254, 318/138, 439, 700, 705, 701, 721
See application file for complete search history.

(56) References Cited

U.S. PATENT DOCUMENTS

| | | | | | |
|---|---|---|---|---|---|
| 3,909,688 | A | * | 9/1975 | Blaschke et al. | 318/700 |
| 4,772,839 | A | * | 9/1988 | MacMinn et al. | 318/696 |
| 6,005,364 | A | * | 12/1999 | Acarnley | 318/632 |
| 6,498,452 | B1 | * | 12/2002 | Luukko | 318/700 |

FOREIGN PATENT DOCUMENTS

WO    WO 0072437    11/2000

OTHER PUBLICATIONS

Schroedl, M., Sensorless control of AC machines at low speed and standstill based on the "INFORM" method, IAS '96. Conference Record of the 1966 IEEE Industry Application Conference Thirty-First IAS Annual Meeting, San Diego, CA, USA, Oct. 6-10, 1996, Published: 1996, New York, NY, USA, IEEE, USA; ISBN 0-7803-3544-9, vol. 1, pp. 270-277.

* cited by examiner

*Primary Examiner*—Rina Duda
(74) *Attorney, Agent, or Firm*—Dykema Gossett PLLC

(57) ABSTRACT

A method for determining a rotor position angle of a synchronous machine, the method comprising the steps of determining inductances (LA, LB, LC) of the synchronous machine in stator phase directions; generating an inductance vector (L) on the basis of the determined inductances (LA, LB, LC); and determining the rotor position angle (qr) on the basis of the determined inductance vector angle.

3 Claims, 2 Drawing Sheets

METHOD FOR DETERMINING ROTOR POSITION ANGLE OF SYNCHRONOUS MACHINE

BACKGROUND OF THE INVENTION

The invention relates to a method for determining a rotor position angle of a synchronous machine. A synchronous machine generally consists of a stator provided with three-phase winding and a magnetised rotor. The rotor is typically magnetised either by means of permanent excitation or separate excitation. In permanent excitation the rotor is provided with permanent magnet blocks, which the magnetic field produced in the stator pulls towards itself, thereby rotating the rotor. Separate excitation of the rotor means that the rotor contains coils of wire to which current is supplied. The coils of wire thus form magnetic poles in the rotor, the poles functioning according to the same principle as poles made of permanent magnets. In addition, the rotor of the synchronous machine may be a salient-pole rotor or a cylindrical rotor. In cylindrical rotor machines the rotor inductance remains almost constant with respect to the stator, whereas in salient-pole machines, the rotor inductance varies greatly due to changes in the air gap between the rotor and the stator, depending on the rotor position angle.

In speed-controlled synchronous machines, it is important for the functioning of the control system that the position angle of the machine's rotor is known as precisely as possible. Particularly in control methods based on direct control of the machine's stator flux the accuracy of angle determination has a great influence on the accuracy of the control. The rotor position angle is usually determined using a pulse encoder or an absolute sensor the information supplied by which allows the rotor angle to be determined.

The measurement result obtained from the angle sensor contains errors caused at least by two different components that can be determined. The first known error-causing component is an incorrect initial angle, which is determined by an angle sensor. Various estimation algorithms have been proposed for estimating the initial angle. However, the rotor can be initially turned in a desired direction, provided that the motor load allows this. The rotor is preferably turned so that it is in the same direction as the coil of a phase, for example. The rotor can be turned by supplying direct current to the desired phase, thus causing the rotor to turn in the desired direction. However, due to the purposes of use of synchronous machines, it is often impossible to determine and correct the initial angle by turning the rotor.

In a salient-pole synchronous machine, such as a separately excited synchronous machine or one comprising permanent magnet magnetisation, or in a synchronous reluctance machine, the stator inductance $L_s$ in stationary co-ordinates varies as a function of the rotor angle $\theta_r$, as shown by the following equation:

$$L_s = L_{s0} + L_{s2} \cos 2\theta_r.$$

Inductance varies around the basic value $L_{s0}$ at twice the rotor angle in a magnitude indicated by the inductance coefficient $L_{s2}$. The inductance coefficients $L_{s0}$ and $L_{s2}$ are defined as follows:

$$L_{s0} = \frac{L_{sd} + L_{sq}}{2},$$

$$L_{s2} = \frac{L_{sd} - L_{sq}}{2},$$

where the inductances $L_{sd}$ ja $L_{sq}$ represent the direct-axis and quadrature-axis transient inductances of the synchronous machine.

The utilization of the above equation for determining the initial angle of the rotor is known per se and discussed for example in S. Östlund and M. Brokemper, "Sensorless rotor-position detection from zero to rated speed for an integrated PM synchronous motor drive," *IEEE Transactions on Industry Applications*, vol. 32, pp. 1158–1165, September/October 1996 and M. Schroedl, "Operation of the permanent magnet synchronous machine without a mechanical sensor," in *Int. Conf. on Power Electronics and Variable Speed Drives*, pp. 51–55, 1990.

According to M. Leksell, L. Harnefors, and H.-P. Nee, "Machine design considerations for sensorless control of PM motors," in *Proceedings of the International Conference on Electrical Machines ICEM'98*, pp. 619–624, 1998, sinusoidally altering voltage is supplied to a stator in the assumed direct-axis direction of the rotor. If this results in a quadrature-axis current in the assumed rotor coordinates, the assumed rotor coordinates are corrected such that the quadrature-axis current disappears. The reference states that a switching frequency of the frequency converter supplying the synchronous machine should be at least ten times the frequency of supply voltage. Thus, the maximum supply voltage frequency of a frequency converter capable of a 5 to 10 kHz switching frequency is between 500 and 1000 Hz. This is sufficient for an algorithm to function. Switching frequencies of this magnitude can be achieved by IGBT frequency converters, but with GTO or IGCT power-switch frequency converters, which are required at higher powers; the maximum switching frequency is less than 1 kHz. In that case the maximum frequency of the supply voltage in the initial angle estimation is below 100 Hz. At such a low frequency the machine develops torque and the accuracy of the algorithm is considerably impaired.

In the reference by M. Schroedl, 1990, the initial angle is calculated directly from one inductance measurement or, if more measurements are used, the additional information is utilized by eliminating inductance parameters. A drawback of this method is that an error, which is inevitable in measuring, has a great influence. To measure inductance, a current impulse is supplied to a stator and the flux linkage thereby caused is used to calculate the inductance. Errors may appear because of an error in the current measuring or because the measuring current produces torque, which swings the rotor.

In the method disclosed by S. Östlund, M. Brokemper, the rotor angle is not calculated directly, but the minimum inductance is searched for by starting the measurement of inductances in different directions, first at long intervals and then, as the minimum is being approached, by reducing the angular difference in successive measurements. Although it is not mentioned in the article, the method easily catches fictitious minima resulting from measuring errors and thus an error value may be extremely high.

BRIEF DESCRIPTION OF THE INVENTION

It is an object of the present invention to provide a method that avoids the above disadvantages and provides a relatively simple means for determining an initial angle of a synchronous machine. This is achieved by the method of the invention which is characterized by comprising the steps of determining inductances of the synchronous machine in stator phase directions; forming an inductance vector on the basis of the determined inductances; and determining a position angle of the rotor on the basis of the determined inductance vector angle.

The invention is based on the idea that by determining the inductances in stator phase directions and by forming a vector of these inductances, the vector angle allows the rotor position angle to be determined.

The method of the invention enables an initial angle of the rotor to be determined by means of a relatively simple calculation, which can be easily executed by software. Moreover, the application of the method does not depend in any way on the parameters of the machine to be examined and therefore the parameters do not need to be known in advance.

A synchronous machine is typically desired to start without a delay. Since the method is simple, it is relatively rapid to execute also in connection with starting, unnoticed by the user. Although the method is simple, the accuracy of the determining of the initial angle is not significantly impaired compared with other, known, methods.

BRIEF DESCRIPTION OF THE DRAWINGS

In the following, the invention will be described in greater detail with reference to the preferred embodiments and the accompanying drawings, in which.

DETAILED DESCRIPTION OF THE INVENTION

According to the invention, synchronous machine inductances $L_A$, $L_B$, $L_C$ are determined in stator phase directions. The inductances are measured in an ordinary manner by causing a voltage impulse in the stator winding and by observing the behaviour of the current formed thereby, the inductance being then determined on the basis of the behaviour of this current.

According to a preferred embodiment of the invention, the inductances are also measured in opposite phase directions, in which case the values selected for the inductances $L_A$, $L_B$, $L_C$ will represent the average of the inductance measured in phase direction and the one measured in the opposite direction. This allows inductance to be determined with greater accuracy.

Figure 2A:
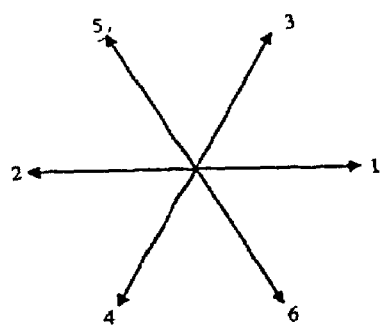
FIGS. 2a and 2b show a measuring arrangement of six measurements and the inductance averages formed of these.
Figure 2B:
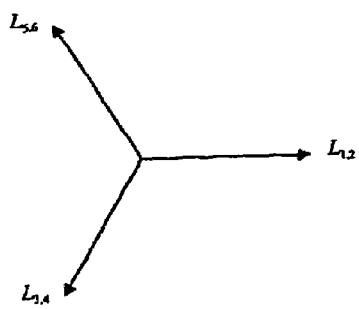

The inductances should be determined in an order which produces as little motor-winding torque as possible. In a set of six measurements the measurement order shown in FIG. 2a is preferred. The Figure shows the order of the measurement with numbers from 1 to 6, the result of the measurement being shown in FIG. 2b as inductance averages $L_{12}$, $L_{34}$, $L_{56}$, which are then applied as the values of inductances $L_A$, $L_B$, $L_C$. The measurement order always aims at maximizing the change in the direction of the inductance measurement, the change then correspondingly minimizing the turning of the rotor.

Further according to the invention, the determined inductances $L_A$, $L_B$, $L_C$ are used to form an inductance vector L. The vector formed of the measured inductances $L_A$, $L_B$, $L_C$ may take the following format:

$$L = L_A + L_B e^{j2\pi/3} + L_C e^{j4\pi/3}.$$

Further according to the invention, a rotor position angle $\theta_r$ is determined on the basis of the angle of the determined inductance vector L. The interdependence of the vector, which is formed in a manner known per se of inductances in stator phase directions, and the rotor angle can be expressed in the form of the following equation:

$$arg(L) = -2\theta_r.$$

Figure 1A:
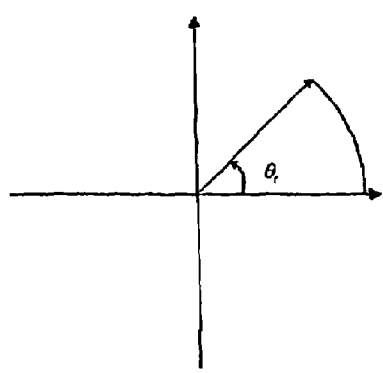
FIGS. 1a and 1b show the interdependence of a rotor angle and a formed inductance vector.
Figure 1B:
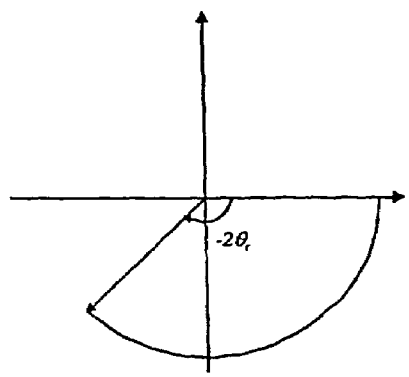

In this equation $\theta_r$ represents the direct-axis rotor angle and L a vector formed of the inductances. The relationship between the rotor angle and the inductance vector L based on the above equation is illustrated in FIGS. 1a and 1b.

Figure 3:
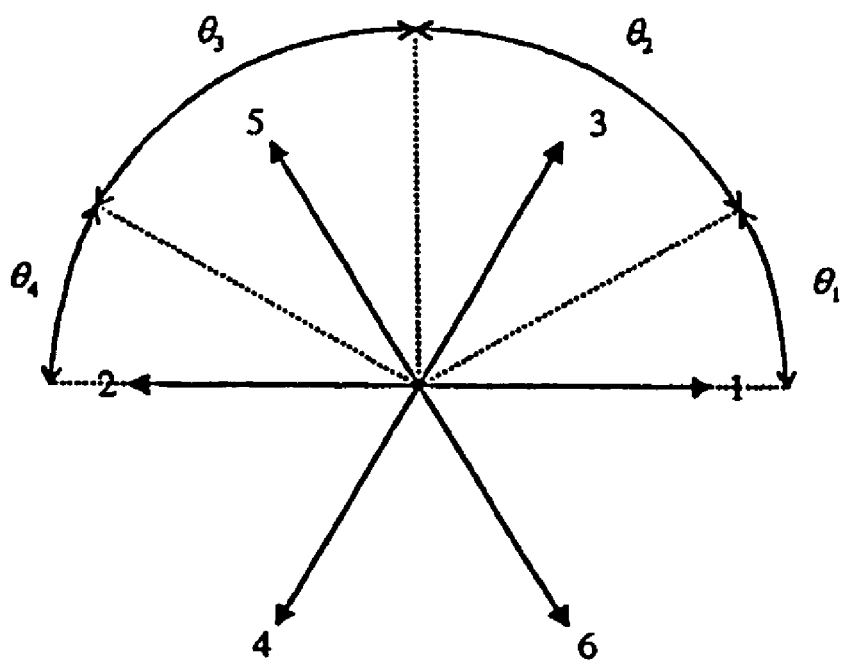
FIG. 3 illustrates the determining of polarity.

When the method of the invention is applied to a permanent magnet machine, the polarity of the synchronous machine can be fairly reliably checked by using the already made inductance measurements, provided that the six measurements according to the preferred embodiment are carried out. Polarity can be determined on the basis of two measurements made in opposite directions by using always the inductance of the sector accommodating the direct-axis angle and the inductance measured in the opposite direction. The principle of polarity determining is shown in FIG. 3 in which a pattern formed by the measurement directions is placed into a semi-circle divided into sectors $\theta_1$, $\theta_2$, $\theta_3$, $\theta_4$. For the polarity check to be successful, the inductances must be measured using a sufficiently strong current. This allows a sufficiently great difference between the inductances measured in opposite directions to be obtained for reliable polarity determining.

If the inductances are measured using only the three measurements of the invention, polarity can be determined in an ordinary manner by using additional measurements serving for this purpose alone and carried out in the direct-axis direction.

It is apparent to a person skilled in the art that as technology advances the basic idea of the invention can be implemented in various ways. The inventions and its embodiments are therefore not restricted to the above examples, but they may vary within the scope of the claims.

The invention claimed is:

1. A method for determining a rotor position angle of a synchronous machine, comprising the steps of:
    determining inductances ($L_A$, $L_B$, $L_C$) of the synchronous machine in stator phase directions;
    forming an inductance vector (L) on the basis of the determined inductances ($L_A$, $L_B$, $L_C$); each vector having an angle that is dependent on the magnitudes of the determined inductances; and
    determining a rotor position angle ($\theta r$) on the basis of the determined inductance vector angle.

2. A method according to claim 1, wherein the inductances ($L_A$, $L_B$, $L_C$) of the synchronous machine are also determined in opposite stator phase directions and that the inductance vector is formed on the basis of the averages of the inductances determined in the phase directions and in the opposite directions.

3. A method according to claim 2, wherein the method further comprises a step of also determining the polarity of the rotor of the synchronous machine, after the position angle has been determined, on the basis of the inductance measurements already carried out.

* * * * *